(12) United States Patent
Grobis et al.

(10) Patent No.: US 8,514,672 B2
(45) Date of Patent: Aug. 20, 2013

(54) NEAR-FIELD TRANSDUCER WITH THERMAL SENSOR AND SYSTEM FOR CLOCKING WRITE DATA IN A PATTERNED-MEDIA MAGNETIC RECORDING DISK DRIVE

(75) Inventors: Michael Konrad Grobis, San Jose, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 331 days.

(21) Appl. No.: 12/862,633

(22) Filed: Aug. 24, 2010

(65) Prior Publication Data
US 2012/0051196 A1    Mar. 1, 2012

(51) Int. Cl.
*G11B 5/00*    (2006.01)
(52) U.S. Cl.
USPC ........... 369/13.33; 369/13.24; 369/13.26; 369/13.28; 360/59
(58) Field of Classification Search
USPC ........... 360/125.32, 125.31, 59, 114.02; 369/13.24, 13.26, 13.33, 13.28
See application file for complete search history.

(56) References Cited

U.S. PATENT DOCUMENTS

| 6,754,017 | B2 * | 6/2004 | Rettner et al. ............. 360/51 |
| 7,095,767 | B1 | 8/2006 | Thornton et al. | |
| 2003/0058559 | A1 | 3/2003 | Brand et al. | |
| 2003/0103437 | A1 * | 6/2003 | Kimura ............... 369/112.02 |
| 2006/0098213 | A1 * | 5/2006 | Itoh et al. ............ 356/632 |
| 2007/0159718 | A1 * | 7/2007 | Kim et al. ............ 360/125 |
| 2008/0149809 | A1 | 6/2008 | Hamann et al. | |
| 2009/0002867 | A1 * | 1/2009 | Gage et al. ............ 360/51 |
| 2009/0080321 | A1 * | 3/2009 | Kimura et al. ......... 369/112.23 |
| 2009/0251828 | A1 * | 10/2009 | Schreck et al. ............ 360/319 |
| 2010/0061018 | A1 * | 3/2010 | Albrecht et al. ........... 360/135 |
| 2012/0008230 | A1 * | 1/2012 | Nishioka et al. ............ 360/59 |

OTHER PUBLICATIONS

W.A. Challener et al., "Heat-assisted magnetic recording by a near-field transducer with efficient optical energy transfer", Nature Photonics, Published Online: Mar. 22, 2009, www.nature.com/naturephotonics.

Shengbin Hu, "Laser irradiation and its effects on heat transfer in heat assisted magnetic recording", Review of Scientific Instruments 77, 034703 (2006).

* cited by examiner

*Primary Examiner* — Thomas Alunkal
(74) *Attorney, Agent, or Firm* — Thomas R. Berthold

(57) ABSTRACT

A near-field transducer (NFT) has a primary tip that concentrates the oscillating charge of the NFT onto a substrate, such as magnetic recording medium, to heat regions of the medium, and a secondary tip. The secondary tip is located close to a temperature sensor, such as an electrical conductor whose resistance varies with temperature. The temperature sensor senses heat from the secondary tip and thus properties of the substrate like surface topography and the presence or absence of metallic material. The NFT can be part of a bit-patterned media (BPM) thermally-assisted recording (TAR) disk drive. The temperature sensor output is used to control the write pulses from the disk drive's write head so the magnetic write field is synchronized with the location of the magnetic data islands.

17 Claims, 7 Drawing Sheets

NEAR-FIELD TRANSDUCER WITH THERMAL SENSOR AND SYSTEM FOR CLOCKING WRITE DATA IN A PATTERNED-MEDIA MAGNETIC RECORDING DISK DRIVE

BACKGROUND OF THE INVENTION

1. Field of the Invention

This invention relates generally to near-field transducers (NFT) like those used in a thermal assisted recording (TAR) type of magnetic recording disk drive, and more particularly to a TAR disk drive with patterned media.

2. Description of the Related Art

Magnetic recording hard disk drives with patterned magnetic recording media, also called bit-patterned media (BPM), have been proposed to increase the data density. In patterned media, the magnetic material on the disk is patterned into small isolated data islands or islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned islands, the magnetic moment of the regions between the islands must be destroyed or substantially reduced so as to render these regions essentially nonmagnetic. Alternatively, the media may be fabricated so that that there is no magnetic material in the regions between the islands.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. The trenches are recessed far enough from the read/write head to not adversely affect reading or writing. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

Heat-assisted magnetic recording (HAMR), also called thermally-assisted recording (TAR), has been proposed. In TAR systems, an optical waveguide with a near-field transducer (NFT) directs heat from a radiation source, such as a laser, to heat localized regions of the magnetic recording layer on the disk. The radiation heats the magnetic material locally to near or above its Curie temperature to lower the coercivity enough for writing to occur by the write head. This type of TAR disk drive is described in U.S. Pat. No. 5,583,727 and U.S. Pat. No. 6,982,844. TAR systems have been proposed for patterned-media disk drives, wherein each data island is heated simultaneously with the application of the write field from the write head.

In conventional magnetic recording where the data bits are written on continuous media, there is no requirement to write to precise positions on the media since all of the media contains magnetic material. However, with patterned media, because the data islands are single-domain, the transitions between bits may occur only between islands. Since the magnetic transitions are restricted to predetermined locations governed by the locations of individual islands, it is necessary to synchronize the reversal of write current in the write head with the passing of individual islands under the head. U.S. Pat. No. 6,754,017 B2, assigned to the same assignee as this application, describes a magnetic recording disk drive with patterned media that uses a special pattern-sensor that senses the data islands before they pass beneath the write head and generates a write-clock signal. U.S. patent application Ser. No. 11/209,089, filed Sep. 11, 2008, published as US 2010/0061018 A1 and assigned to the same assignee as this application, describes a TAR disk drive with a radiation detector that detects radiation from the NFT that is reflected from the data islands and nonmagnetic regions as the disk rotates, with the radiation detector output being used to control the clocking of write pulses from the write head.

What is needed is a patterned-media TAR disk drive that has a method for detecting the data islands to generate an accurate write-clock signal so that the data can be accurately written to the patterned data islands.

SUMMARY OF THE INVENTION

The invention relates to a near-field transducer (NFT) with a primary tip that concentrates the oscillating charge of the NFT onto a substrate, such as magnetic recording medium, to heat regions of the medium, and a secondary tip that forms part of a thermal probe. The secondary tip on the NFT detects the amplitude of the charge oscillation in the NFT. Because this amplitude can be affected by the surface of the substrate, the thermal probe can be used for sensing properties of the substrate like surface topography and the presence or absence of metallic material.

The invention also relates to a bit-patterned media (BPM) thermally-assisted recording (TAR) disk drive with the NFT. The secondary tip of the NFT is located close to a temperature sensor, such as an electrical conductor whose resistance varies with temperature. The primary tip concentrates the charge in the NFT to create an intense near-field pattern that heats the magnetic data islands simultaneously. The secondary tip also concentrates the charge in the NFT to create an intense near-field pattern, but this heats the temperature sensor. The optical power dissipated at the disk depends on whether the primary tip has interacted with a magnetic data island or a space between the islands, and this causes a change in the optical power generated by the secondary tip and thus the temperature sensed by the temperature sensor. The temperature sensor is connected to sensor circuitry, which may be a circuit that detects a voltage change as the resistance of the temperature sensor changes. The output signal from the sensor circuitry is directed to control circuitry and thus represents changes in dissipated optical power as islands and spaces pass the primary tip of the NFT. The control circuitry generates the write clock signal that controls the write pulses from the write head so the magnetic write field is synchronized with the location of the magnetic data islands.

For a fuller understanding of the nature and advantages of the present invention, reference should be made to the following detailed description taken together with the accompanying figures.

DETAILED DESCRIPTION OF THE INVENTION

The invention relates to a near-field transducer (NFT) with an integrated thermal probe. As used herein a "near-field" transducer refers to "near-field optics", wherein the passage of light is through an element with subwavelength features and the light is coupled to a second element, such as a substrate like a magnetic recording medium, located a subwavelength distance from the first element. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. Sometimes, the metal structure can create resonant charge motion, called surface plasmons or local plasmons, to further increase intensity. The electromagnetic field of the oscillating tip charge then gives rise to optical output in the near field, which may be directed onto, for example, a substrate such as magnetic recording medium to heat regions of the medium.

The thermal probe can be a secondary apex or tip on the NFT that detects the amplitude of the charge oscillation in the NFT. Because this amplitude can be affected by surface topography of the substrate, the thermal probe can be used for a diverse range of applications, including sensing the spacing between the NFT and the substrate and sensing properties of the substrate like the presence or absence of metallic material.

Figure 1A:
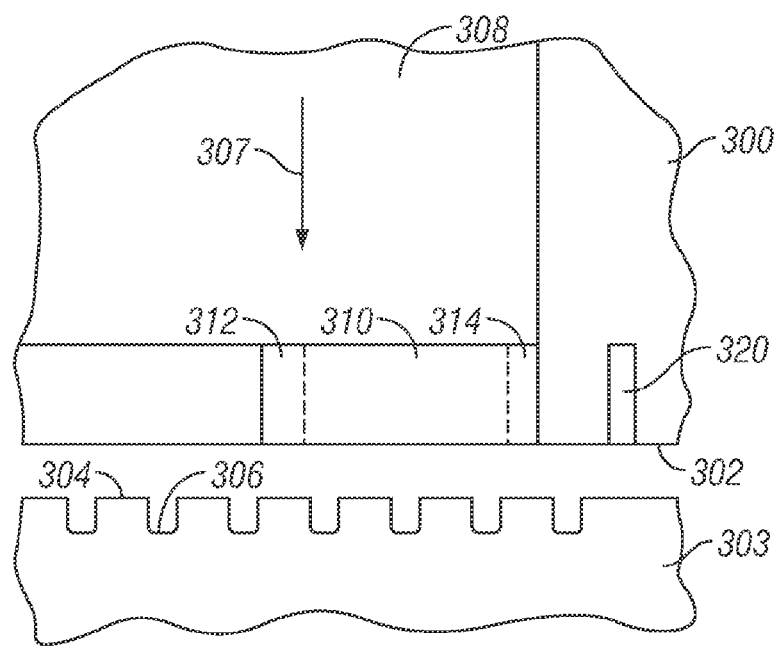
FIG. 1A is a side sectional view, through section 1A-1A of FIG. 1B, of the carrier and near-field transducer (NFT) adjacent a substrate with peaks and valleys.
Figure 1B:
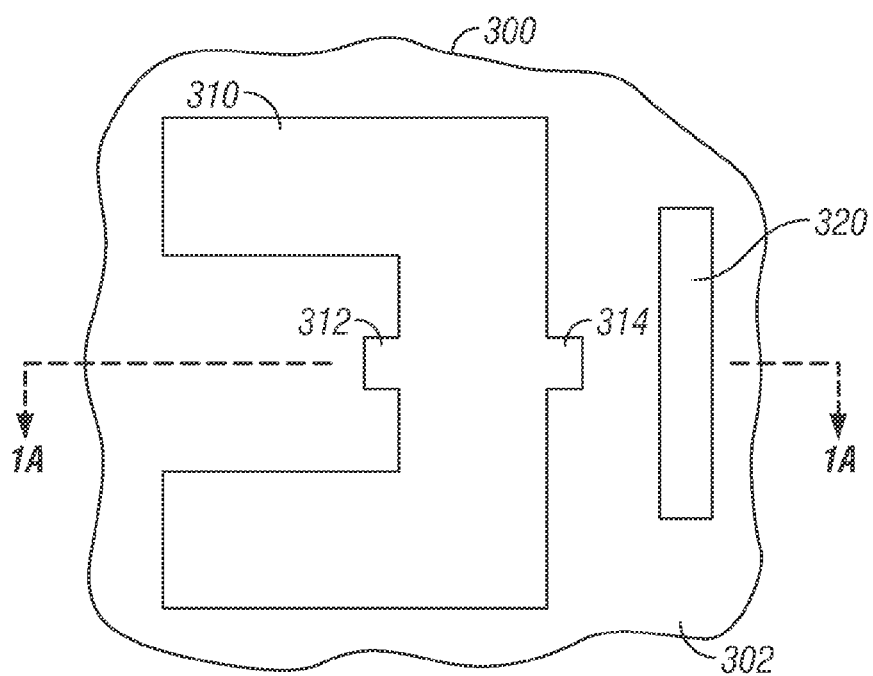
FIG. 1B is a view of the substrate-facing surface of the carrier and depicts the NFT as an "E" shaped antenna.

FIG. 1A is a side sectional view, through section 1A-1A of FIG. 1B, of NFT carrier 300 having a substrate-facing surface 302 near a substrate 303. As will be described later, the carrier 300 may be a disk drive slider with the substrate-facing surface 302 being the slider's air-bearing surface (ABS), and the substrate 303 may be a magnetic recording disk. The plane of section 1A-1A and the dashed line in FIG. 1B would be parallel to the track direction of the data tracks on the disk, and the cross-track direction would be orthogonal to the dashed line in FIG. 1B. The substrate 303 is depicted with a surface topography of peaks 304 and valleys 306. The carrier 300 supports the NFT 310 that has a primary tip 312 and a secondary tip 314, and an optical channel or waveguide 308 that directs radiation (arrow 307) from a laser light source (not shown) to the NFT 310. The secondary tip 314 is located near a temperature sensor 320. FIG. 1B is a view of the carrier surface 302 and depicts the NFT 310 as an "E" shaped antenna with a primary tip 312 and a secondary tip 314. The "E" shape and the shape of the tips may be formed by e-beam lithography or optical lithography. The height of the metal film of the NFT 310 perpendicular to the substrate plane has a dimension preferably between about 75 to 125 nm. The distance between the inside corners of the NFT 310 in the cross-track direction may have a dimension of about 250 to 400 nm and the distance between the base of the two tips may be about 100 to 180 nm. Each of the tips 312, 314 has a cross-track width of about 10-40 nm and an along-the-track length of about 20-50 nm. The wavelength of the laser may be in the range 750 nm to 1000 nm to be matched to these E-antenna dimensions. The sensor 320 may be an electrically conductive "nanowire" whose resistance changes with temperature. When polarized light is aligned with the primary tip 312 of the E-antenna, an intense near-field pattern is created at the end of the tip 312. Resonant charge motion can occur at the primary tip 312 by adjusting the E-antenna dimensions to match a local plasmon frequency with the incident light wavelength. The NFT 310 focuses the input optical power to a very small spot on the surface of the substrate 303 adjacent the primary tip 312. In one example, for a gold NFT with a 24 nm wide primary tip 312 and a substrate 303 where the peaks 304 are cobalt islands 20 nm high with a 24 nm diameter, then more than 10% of the optical power in the waveguide 308 is dissipated in a single cobalt island.

The secondary tip 314 forms part of the NFT 310 and is located at a local maximum in the charge density oscillation. The secondary tip 314 further concentrates the charge in the gold NFT 310 to create an intense near-field pattern similar to the pattern of the primary tip 312. The secondary tip 314 causes a temperature rise in the substrate 303 that is only about 15% of the peak temperature rise caused by the primary tip 312. The electrically conducting nanowire (sensor 320) is located adjacent to the secondary tip 314 and is heated by the optical near-field generated by the secondary tip 314. The degree of nanowire heating is influenced by the amplitude of the charge density oscillation in the NFT 310. At constant input power from the laser light source, the amplitude of the charge density oscillation in the NFT 310 will be most affected by the region of the substrate 303 directly adjacent the primary tip 312. The charge density oscillation amplitude (and thus nanowire heating) is affected by any substrate region that changes the total optical power delivered to the substrate 303. For example, if a single cobalt island is located adjacent primary tip 312, about 10% of the incident optical power is dissipated in the island, which means that the charge density oscillation is smaller at the secondary tip 314, resulting in a reduction in heating of the nanowire. When the island passes the primary tip 312, the charge density oscillation increases and this increases the optical power delivered to the nanowire by the secondary tip 314 and thus increases the temperature of the nanowire.

Figure 2A:
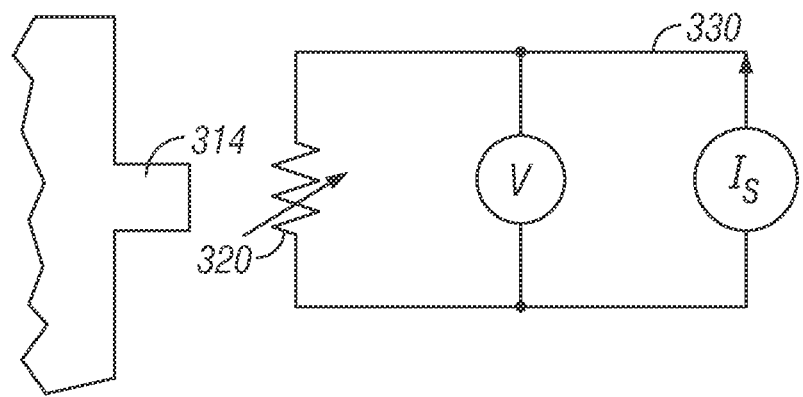
FIG. 2A is a simple circuit illustrating how the temperature sensor functions as a variable resistor in response to changes in temperature caused by heating (and cooling) as the amplitude of charge density oscillation changes in the secondary tip of the NFT.
Figure 2B:
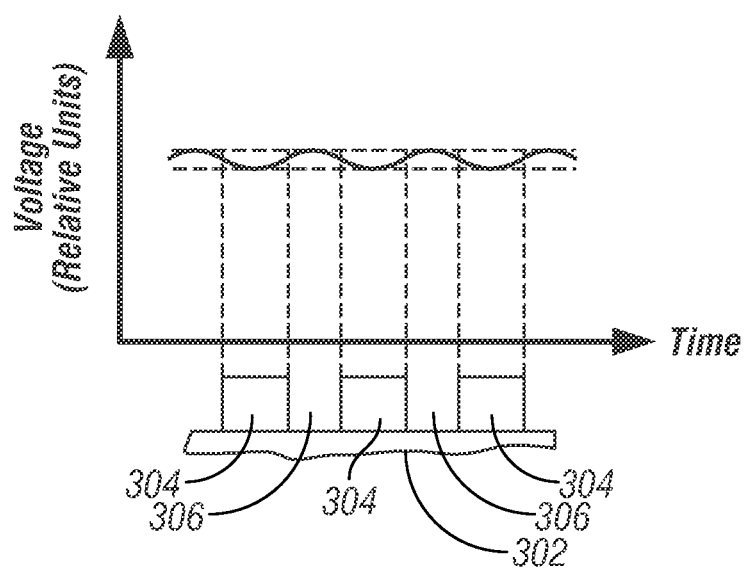
FIG. 2B is a graph of voltage (in relative units) of the circuit of FIG. 2A as a function of time as the peaks and valleys of the substrate move past the primary tip of the NFT.

FIG. 2A is a simple circuit 330 for illustrating how the nanowire (sensor 320) functions as a variable resistor in response to changes in temperature caused by heating (and cooling) as the amplitude of charge density oscillation changes in the secondary tip 314. A current source $I_s$ supplies a constant current to the sensor 320 and the change in temperature changes the resistance which is detected as a change in voltage of circuit 330. FIG. 2B is a graph of voltage (in relative units) of circuit 330 as a function of time as the islands (peaks 304) and spaces (valleys 306) move past the primary tip 312. The islands are closer to primary tip 312 than the valleys 306 and thus dissipate more optical power from the primary tip 312, which reduces the optical power delivered by secondary tip 314 to sensor 320. This reduces the heating of sensor 320 and thus the resistance of sensor 320, resulting in a drop in voltage. FIG. 2A depicts a substrate 303 with a surface topography of peaks and valleys so that the voltage output of circuit 330 (FIG. 2B) detects variations in surface topography or spacing between the carrier surface 302 and the upper surface of substrate 303. However, the valleys 306 can be filled with non-metallic material so that the substrate surface is substantially planar with the peaks 304 being metallic pillars. Then the voltage drops of circuit 330 would represent the presence of metallic regions adjacent the primary tip 312, like metallic magnetic data islands in patterned media.

Figure 3:
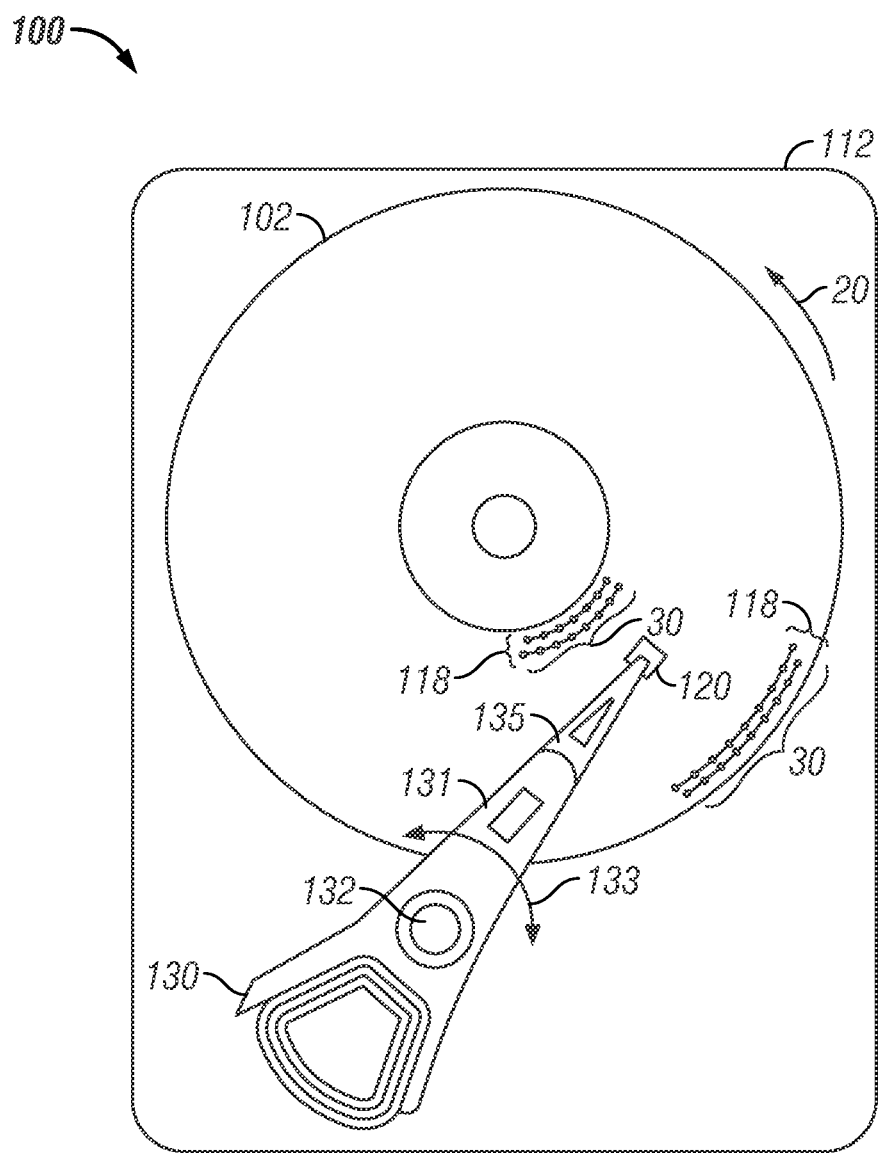
FIG. 3 is a top view of a patterned-media magnetic recording disk drive with a patterned-media magnetic recording disk.

The use of the NFT with integrated thermal probe according to the invention will now be described for use in a patterned-media TAR disk drive to control the clocking of write pulses from the write head. In a patterned-media TAR disk drive, the magnetic data islands are formed of a high-anisotropy material to provide thermal stability, but the coercivity of the high-anisotropy material is greater than the magnetic field that can be generated by the write head. The NFT heats the magnetic material of the data islands to near or above the material's Curie temperature to lower the coercivity enough for writing to occur by the write head. FIG. 3 is a top view of a patterned-media magnetic recording disk drive 100 with a patterned-media magnetic recording disk 102. The drive 100 has a housing or base 112 that supports an actuator 130 and a drive motor for rotating the magnetic recording disk 102. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 102 and enables it to "pitch" and "roll" on the air-bearing generated by the disk 102 as it rotates in the direction of arrow 20. A magnetoresistive read head (not shown) and an inductive write head (not shown) are typically formed as an integrated read/write head patterned as a series of thin films and structures on the trailing end of the slider 120, as is well known in the art. In a TAR disk drive the slider 120 also supports the optical waveguide (not shown) and the NFT (not shown) for heating the data islands. The laser light source (not shown) may also be located on slider 120. The slider 120 is typically formed of a composite material, such as a composite of alumina/titanium-carbide ($Al_2O_3$/TiC). Only one disk surface with associated slider and read/write head is shown in FIG. 3, but there are typically multiple disks stacked on a hub that is rotated by a spindle motor, with a separate slider and read/write head associated with each surface of each disk.

The patterned-media magnetic recording disk 102 includes a disk substrate and discrete data islands 30 of magnetizable material on the substrate. The data islands 30 are arranged in radially-spaced circular tracks 118, with only a few islands 30 and representative tracks 118 near the inner and outer diameters of disk 102 being shown in FIG. 3. As the disk 102 rotates in the direction of arrow 20, the movement of actuator 130 allows the read/write head on the trailing end of slider 120 to access different data tracks 118 on disk 102.

Figure 4:
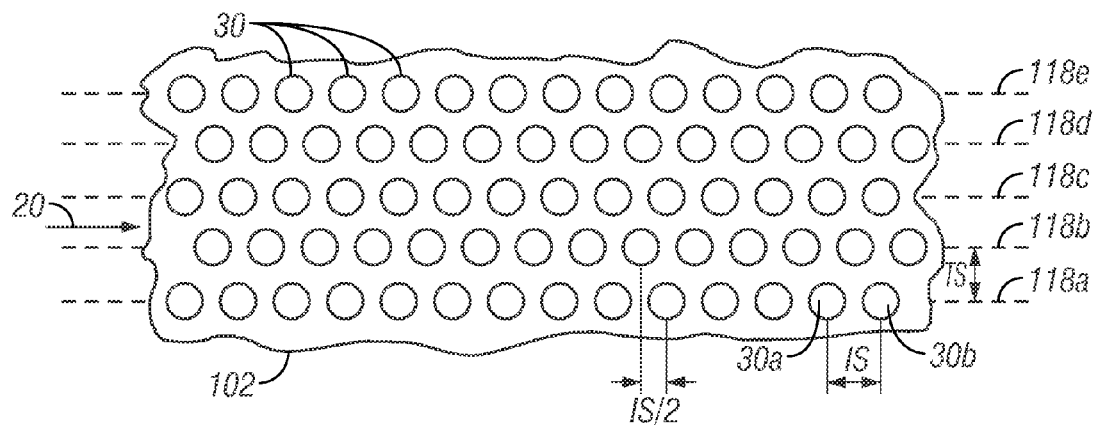
FIG. 4 is a top view of an enlarged portion of a patterned-media disk showing the detailed arrangement of the data islands.

FIG. 4 is a top view of an enlarged portion of disk 102 showing the detailed arrangement of the data islands 30 on the surface of the disk substrate in one type of pattern according to the prior art. The islands 30 contain magnetizable recording material and are arranged in circular tracks spaced-apart in the radial or cross-track direction, as shown by tracks 118a-118e. The tracks are typically equally spaced apart by a fixed track spacing TS. The spacing between data islands in a track is shown by distance IS between data islands 30a and 30b in track 118a, with adjacent tracks being shifted from one another by a distance IS/2, as shown by tracks 118a and 118b.

Patterned-media disks like that shown in FIG. 4 may be longitudinal magnetic recording disks, wherein the magnetization directions in the magnetizable recording material in islands 30 are parallel to or in-the-plane of the recording layer in the islands, or perpendicular magnetic recording disks, wherein the magnetization directions are perpendicular to or out-of-the-plane of the recording layer in the islands. To produce the required magnetic isolation of the patterned data islands 30, the magnetic moment of the regions or spaces between the islands 30 must be destroyed or substantially reduced to render these spaces essentially nonmagnetic. The term "nonmagnetic" means that the spaces between the islands 30 are formed of a nonferromagnetic material, such as a dielectric, or a material that has no substantial remanent moment in the absence of an applied magnetic field, or a magnetic material in a trench recessed far enough below the islands 30 to not adversely affect reading or writing. The nonmagnetic spaces may also be the absence of magnetic material, such as trenches or recesses in the magnetic recording layer or disk substrate.

Figure 5:
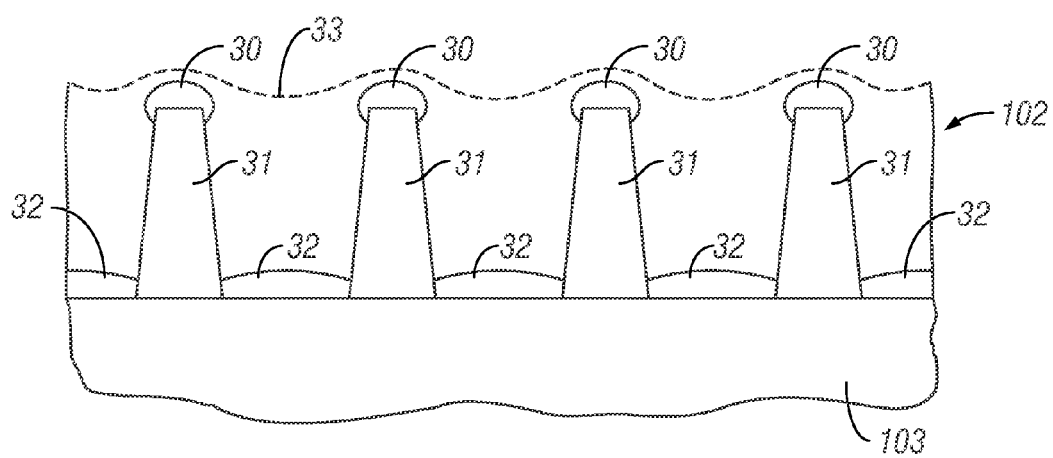
FIG. 5 is a sectional view of a patterned-media disk with data islands as elevated pillars that extend above the disk substrate surface.

Patterned-media disks may be fabricated by any of several known techniques. In one technique a continuous magnetic film is deposited onto a substrate and the film is then ion-beam etched to form the separate data islands. In another type of patterned media, the data islands are elevated, spaced-apart pillars that extend above the disk substrate surface to define recesses or trenches on the substrate surface between the pillars. This type of patterned media is shown in the sectional view in FIG. 5. In this type of patterned media the disk substrate 103 with a pre-etched pattern of pillars 31 and trenches or spaces between the pillars can be produced with relatively low-cost, high volume processes such as lithography and nanoimprinting. The magnetic recording layer material, which typically includes a metal alloy of one or more of Co, Fe and Ni, is then deposited over the entire surface of the pre-etched substrate to cover both the ends of the pillars 31 and the spaces between the pillars 31, resulting in the data islands 30 of magnetic recording layer material and spaces 32 of magnetic recording layer material. The spaces 32 of recording layer material are spaced far enough from the read/write head to not adversely affect reading or writing to the recording layer material in islands 30 and are thus nonmagnetic. The recording layer material in the spaces 32 may also be "poisoned" with a dopant material, for example silicon, so that the recording layer material in the spaces 32 is rendered nonmagnetic. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736; and by Bandic et al., "Patterned magnetic media: impact of nanoscale patterning on hard disk drives", *Solid State Technology* S7+ Suppl. S, September 2006. The patterned-media disk shown in FIG. 5 may also be "planarized", as illustrated by dashed line 33, by covering the disk with non-metallic planarizing material that fills the spaces 32. U.S. Pat. No. 6,680,079 B2 describes a method of planarizing a disk that has topographic features by applying a perfluorinated polyether (PFPE) polymer with a functional acrylate end group, and then curing the polymer.

The writing on patterned-media disks, i.e., the magnetization of the magnetizable material in the data islands by the disk drive write head, requires the synchronization of the write pulses from the write head with the pattern of data islands. A patterned-media magnetic recording disk drive that uses a magnetoresistive, capacitive or thermal sensor to detect magnetized data islands and provide a signal to clock the writing is described in U.S. Pat. No. 6,754,017 B2, assigned to the same assignee as this application.

Figure 6:
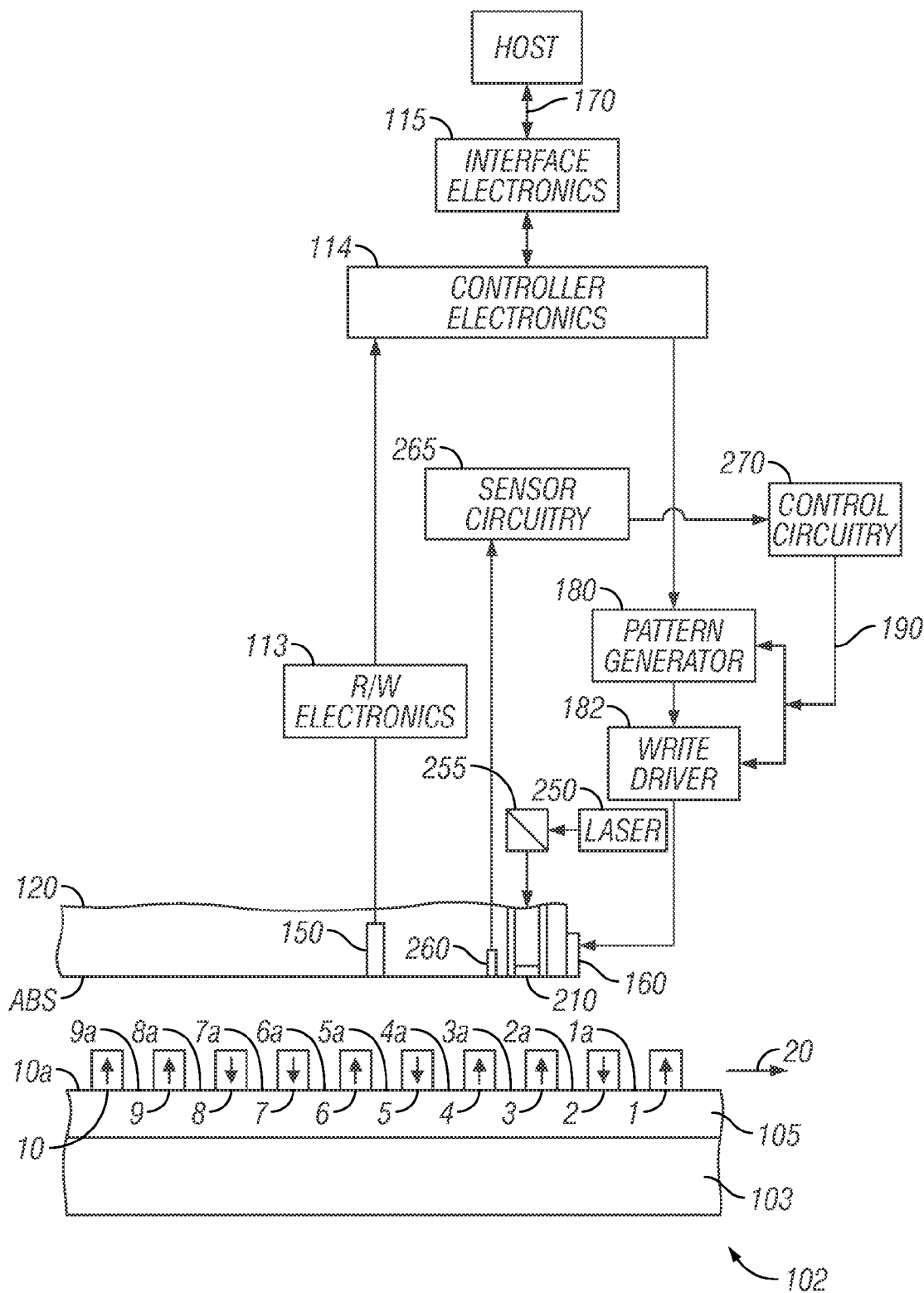
FIG. 6 is a schematic illustrating the general features and operation of an embodiment of the invention.

FIG. 6 is a schematic illustrating the general features and operation of an embodiment of the invention. FIG. 6, which is not drawn to scale because of the difficulty in showing the very small features, shows a sectional view of the patterned-media magnetic recording disk 102 with a data track having discrete magnetizable data islands 1-10 separated by nonmagnetic spaces 1a-10a. The arrows depicted in the islands 1-10 represent the magnetic moments or magnetization directions in the islands, and are depicted for perpendicular or out-of-plane magnetic recording. Thus the disk 102 includes a disk substrate 103 and an optional "soft" or relatively low-coercivity magnetically permeable underlayer (SUL) 105 below the data islands. The SUL 105 is typically any alloy material suitable as the magnetically-permeable flux-return path, such as NiFe, FeAlSi, FeTaN, FeN, CoFeB and CoZrNb. For perpendicular recording, the magnetic material in the data islands 1-10 or on the tops of the data pillars (FIG. 5) may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd), or a chemically ordered L10 phase of FePt alloy. The disk 102 would also typically include a protective overcoat (not shown) over the data islands 1-10.

The air-bearing slider 120 is depicted in sectional view above disk 102 and is shown with the read head 150, the write head 160, optical channel 200 and nanowire 260. The optical channel 200 has the NFT 210 at the disk-facing surface or air-bearing surface (ABS) of the slider 120. A radiation source 250, such as a diode laser, directs radiation to optical waveguide 200. Optionally, there may be optical elements such as a lens or mirror 255 between the laser and waveguide 200 to direct the radiation to the waveguide 200. As is known in the art, there may also be a coupling element (not shown) to improve coupling of the radiation into the waveguide, such as a grating or spot-size converter. The radiation strikes the NFT 210 creating concentrated near-field radiation at the primary tip (not shown) as the disk rotates in the direction 20 past the slider 120. The optical power dissipated at the disk depends on whether the primary tip of NFT 210 has interacted with an island or a space between islands. The nanowire 260 is located near the secondary tip (not shown) of NFT 210 and is connected to sensor circuitry 265, which may be like circuitry 330 in FIG. 2A. The output signal from sensor circuitry 265 is directed to control circuitry 270 and represents changes in dissipated optical power as islands and spaces pass the primary tip of the NFT. The control circuitry 270 generates the write clock signal 190. The read head 150 and write head 160 are formed on the trailing end of slider 120. The recording or writing of data occurs by an inductive coil write head 160 that has a write pole that generates a magnetic field to magnetize the islands as the islands are heated by the primary tip of NFT 210. The islands are magnetized in one of two magnetization directions, depending on the direction of current through the coil of the write head 160. Because the spaces 1a-10a between the islands are nonmagnetic, the write pulses must be precisely timed to magnetize the appropriate islands. In this invention, the nanowire 260, which is heated by the secondary tip of the NFT 210, is used to control the write clock signal 190 so that write pulses are synchronized with the location of the data islands. While FIG. 6 illustrates perpendicular patterned media, wherein the islands 1-10 are depicted with their moments oriented out of the plane of the disk surface, the invention is fully applicable to horizontal or longitudinal patterned media, wherein the islands 1-10 would have their moments oriented parallel to the disk surface.

FIG. 6 also shows schematically the transfer of data between a host system, such as a PC, and the disk drive. The signals from recorded data islands are detected by read head 150, and amplified and decoded by read/write electronics 113. Data is sent to controller electronics 114 and through interface electronics 115 to the host via interface 170. The data to be written to the disk 102 is sent from the host to interface electronics 115 and controller electronics 114 and then as a data queue to pattern generator 180 and then to write driver 182. The write driver 182 generates high-frequency current pulses to the coil of write head 160 which results in the magnetic write fields that magnetize the data islands 1-10. The pattern generator 180 and write driver 182 are controlled by the write clock signal 190.

Figure 7:
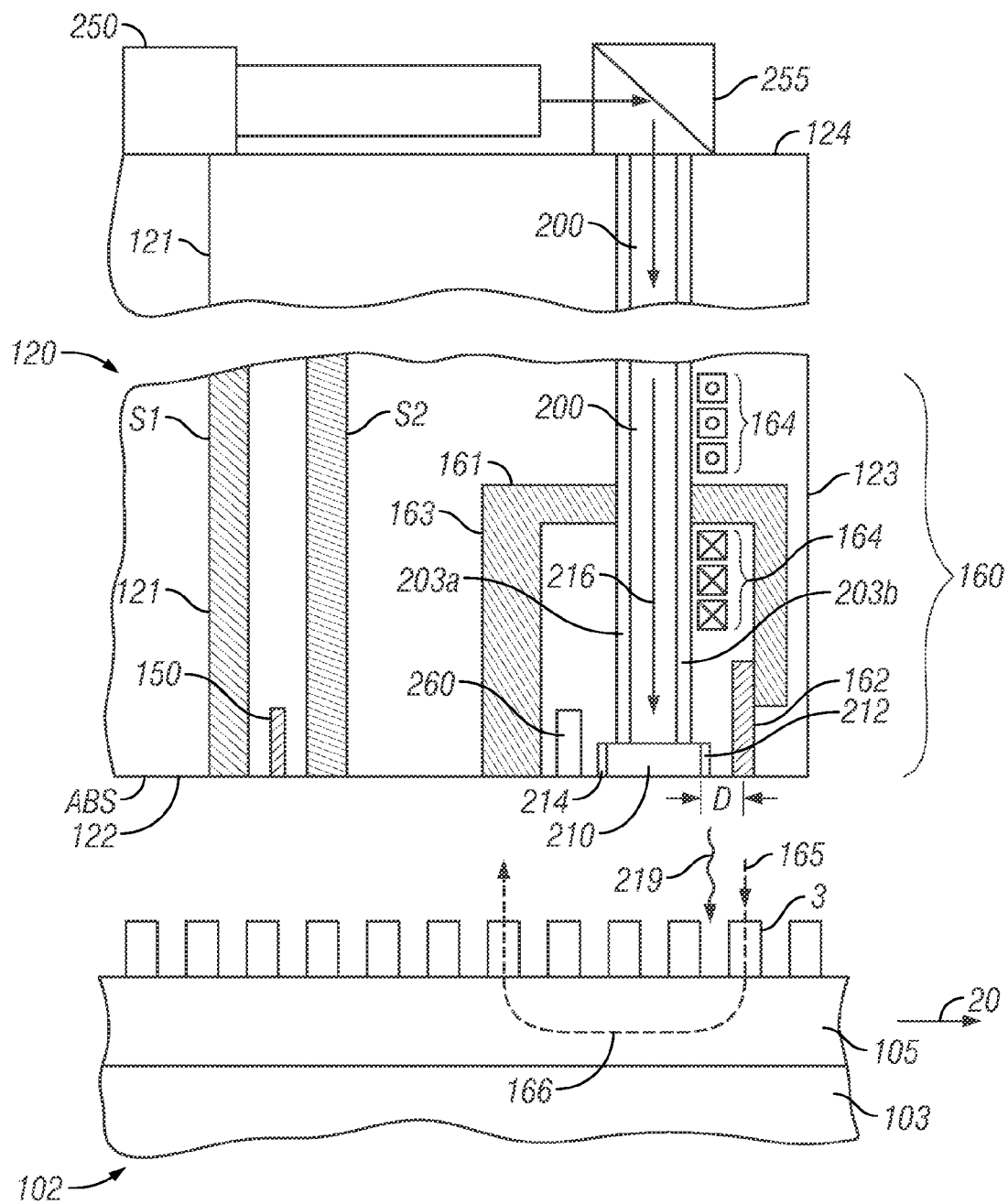
FIG. 7 is a sectional view through a portion of the air-bearing slider and perpendicular magnetic recording disk showing the arrangement of the optical waveguide, write head, NFT and temperature sensor in an embodiment of the invention.

FIG. 7, which is not drawn to scale because of the difficulty in showing the very small features, is a sectional view through a portion of the air-bearing slider 120 and perpendicular magnetic recording disk 102. The slider 120 has a trailing surface 121 and an air-bearing surface (ABS) surface 122 oriented generally perpendicular to trailing surface 121. The slider 120 is typically formed of a composite material, such as a composite of alumina/titanium-carbide ($Al_2O_3$/TiC), and supports the read and write elements typically formed as a series of thin films and structures on its trailing surface 121. The surface 121 is called the trailing surface because of the direction 20 of the disk 102 relative to slider 120. The ABS 122 is the disk-facing surface of the slider 120 that faces the disk 102 and is shown without the thin protective overcoat typically present in an actual slider. The disk-facing surface or ABS shall mean the surface of the slider that is covered with a thin protective overcoat, the actual outer surface of the slider if there is no overcoat, or the outer surface of the overcoat.

The slider 120 supports a conventional magnetoresistive read head 150 located between shields S1 and S2, and a conventional perpendicular write head 160 that includes a magnetic yoke 161 with a write pole 162, a flux return pole 163, and an electrically conductive coil 164. The write pole 162 is formed of conventional high-moment material, such as a FeCoNi alloy. The write coil 164 is shown as wrapped around yoke 161 with the electrical current directions being shown as into the paper by the coil cross-sections marked with an "X" and out of the paper by the coil cross-sections marked with a solid circle. When write-current pulses are directed through coil 164, the write pole 162 directs magnetic flux to the data islands, as represented by arrow 165 directed to data island 3. The dashed line 166 with arrows shows the flux return path through the disk's SUL 103 back to the return pole 163. As is known in the art, the coil may also be of the helical type.

The slider 120 also includes a waveguide or optical channel 200 with a NFT 210 near the ABS 122, and nanowire 260. The NFT 210 has a primary tip 212 and a secondary tip 214. The secondary tip 214 is located near nanowire 260. The optical waveguide 200 is depicted in FIG. 7 as extending through the yoke 161 and being located between the write pole 162 and the return pole 163. The distance "D" in FIG. 7 is the physical spacing or offset in the along-the-track direction between the primary tip 212 and the write pole 162. The optical waveguide 200 may be located at other locations on the trailing surface 121, such as between shield S2 and return pole 163, or between the write pole 162 and the outer face 123 of slider 120. The optical waveguide 200 is formed of a core material such as a high-index-of-refraction dielectric material that is transmissive to radiation at the wavelength of the laser radiation source. Typical radiation-transmissive materials include $TiO_2$ and $Ta_2O_5$. The radiation-transmissive material core material is surrounded by cladding material 203a, 203b that has a lower refractive index than the optical waveguide material and is transmissive to radiation at the wavelength of the laser radiation source. Typical cladding materials include $SiO_2$ and $Al_2O_3$. The optical waveguide 200 may have a uniform cross-section along its length or may be in the form of a planar solid-immersion lens or planar solid-immersion mirror, as is known in the art. The optical waveguide 200 directs radiation to the NFT 210. The NFT may be an antenna type of NFT, like that shown in FIG. 1B, or an aperture type of NFT, with a primary tip 212. The NFT 210 directs near-field radiation, as represented by wavy arrow 219, from the primary tip 212 to the data islands and spaces as the disk 102 moves in the direction 20 relative to the slider 120. The charge oscillations in the primary tip 212 heat the data islands, which dissipate optical power from the primary tip 212. This also causes a reduction in amplitude of the charge oscillations at the secondary tip 214 and thus a lowering of the temperature of nanowire 260. As the regular island pattern passes the primary tip 212, an oscillating resistance in the nanowire 260 is detected and is in-phase with the islands as they pass the primary tip 212. The nanowire 260 may be any electrically conducting material that exhibits a change in resistance (dR) with a change in temperature (dT). To maximize the signal-to-noise ratio (SNR) from the nanowire, the material should have a large dR/dT while the resistance should be smaller than approximately 1 k-ohm to reduce the RC time constant and shot noise. Preferably the nanowire is formed of metal or metal alloy. However, the nanowire may be a thermistor material, a semiconductor, or two materials to form a thermocouple junction, or may be a tunneling junction. In the case of a simple metallic nanowire heated to 100° C. above ambient temperature, the passing of a metal island may reduce the temperature by approximately 20° C., which would result in approximately a 10% drop in resistance. Preferably, the nanowire is relatively short and connected at both ends to large electrical contacts that provide efficient heat sinking of the heat generated in the nanowire, to allow for a very fast response time.

As shown in FIG. 7, the radiation source 250 and mirror 255 may be located on the top surface 124 of slider 120. Alternatively, these optical elements may be located on the actuator arm 131 or suspension 135 (FIG. 1) or at other locations in the disk drive, with the radiation directed from the diode laser through an optical fiber or waveguide. The radiation source 250 may be a laser diode, for example a CD-RW type laser diode that provides optical radiation with a wavelength of approximately 780 nm.

Figure 8:
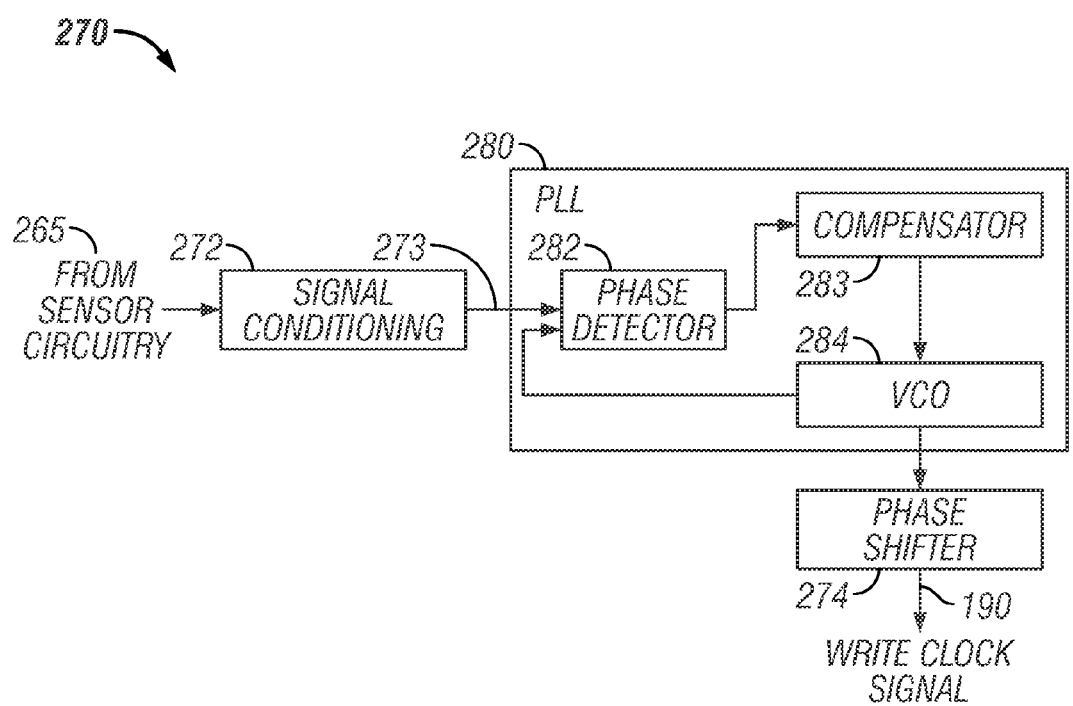
FIG. 8 is a block diagram of control circuitry that receives an analog voltage signal from the sensor circuitry and provides a control signal to the write clock according to an embodiment of the invention.

FIG. 8 is a block diagram of control circuitry 270 that receives an analog voltage signal from sensor circuitry 265 and provides the write clock signal 190. The control circuitry 270 includes signal conditioning circuitry 272, a phase-locked-loop (PLL) 280 and a phase shifter 274. The voltage signal from sensor circuitry 265 is passed to signal conditioning circuitry 272 where it is processed by filtering and/or amplification or other process required to make it suitable for input to PLL 280. The signal conditioning circuitry 272 takes the analog signal from sensor circuitry 265, which is likely to be a series of rounded pulses (perhaps quasi-sinusoidal) and some included noise. The ideal input to the phase detector 282 is a square wave, although a clean periodic wave of any type is usable. Frequencies other than the fundamental period of the radiation detector signal (corresponding to the frequency of passage of islands under the detector) and its harmonics are generally harmful noise and can be filtered out to improve signal quality going into the phase detector 282. A threshold or peak detector can also be used to trigger the generation of a clean square wave suitable for the phase detector 282. As is known in the art, the signal conditioning depends on the original shape of the signal from the sensor circuitry 265 as well as noise components, amplitude, DC offset, etc. The signal conditioning circuitry 272 provides an input reference signal 273 to the PLL 280 and phase shifter 274, which generate a write clock signal 190 that matches the frequency of the reference signal 273 and has a specified phase offset with respect to the reference signal 273. The phase offset is adjustable via phase shifter 274. The PLL 280 includes phase detector 282, voltage-controlled-oscillator (VCO) 284, and compensator 283. The PLL 280 responds to both the frequency and the phase of the input reference signal 273 from signal conditioning circuitry 272, automatically raising or lowering the frequency of VCO 284 until it is matched to the reference signal 273 frequency and phase. The compensator 280 is the feedback loop within the PLL which appropriately adjusts the frequency of the VCO 284 to minimize the error at the phase detector 282. The signal from nanowire 260 will be at the frequency of the passing data islands, while the write clock frequency will be half that frequency since the period of the write clock is the time for two data bits because the write current changes are edge triggered. Thus the signal conditioning circuitry 272 (or other circuitry) will reduce the frequency from sensor circuitry 265 by one-half so that the input reference signal 273 matches the frequency of VCO 284.

The control circuitry 270 also includes phase shifter 274. Because the trailing edge of the magnetic field from the write pole 162 (FIG. 7), which controls the final written state of the data islands during the write process, may not coincide exactly with the edge of the signal from the nanowire 260, an appropriate phase shift is applied, using the phase shifter 274, which may be a programmable phase shifter. Also, if the physical distance between the write pole 162 and the primary tip 212 (shown as "D" in FIG. 7) is relatively large, e.g., tens of island widths, then it may be desirable that a fixed phase shift be applied between the signal from signal conditioning circuitry 272 and the write clock signal 190, using the phase shifter 274. This type of phase shift function can also be implemented within the PLL 280 itself, by adding an offset to the phase detector 282 output before it is sent to compensator 283. Any variation in the shape or placement of a particular island under the primary tip can cause a change in pulse shape or timing, which should not be applied to the synchronization of the write clock which is writing a different island. The effect of the PLL 280 is to average the influence of the signal from the sensor circuitry 265 over many islands, applying the result to adjust the average phase of the write clock signal 190 over a certain range. The PLL 280 has an averaging effect due to the filter (not shown) that is inside the compensator 283. The reason the PLL 280 performs "averaging" over many islands is because the compensator 283 within the PLL 280 responds slowly compared to the period of islands passing under the sensor circuitry 265. It is well-known that PLLs are stable when the adjustment of the VCO is done slowly over time, i.e., the response time of the compensator is much longer than one cycle of the VCO. A straightforward example of a suitable compensator 283 for the PLL 280 is an integrator. The phase error of each pulse (cycle) of the reference signal 273 only causes a small change to the integrated output of the integrator, which has been built up over a large number of cycles. The response time of the PLL 280 needs to be fast enough to respond to real mechanical speed changes, for example those due to disk eccentricity and motor cogging, and mechanical vibrations in the system, which are the changes and disturbances that need to be followed so the write clock signal 190 can be adjusted. The response time of the PLL 280 should not be faster than needed because a faster response increases noise in the PLL 280.

The write synchronization system and method as described above and illustrated with various island diagrams may be implemented in conventional analog or digital hardware components or in software. The servo control processor, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A system for sensing regions of a substrate comprising:
 a laser light source;
 a carrier having a generally planar surface;
 a near-field transducer on the carrier and having a primary tip at said carrier surface for generating heat in response to laser light received at the near-field transducer to heat a region of the substrate when said carrier surface is spaced from the substrate a distance less that the laser light wavelength and a secondary tip at said carrier surface and spaced from the primary tip for generating heat in response to the laser light received at the near-field transducer;
 an optical channel for directing laser light from the source to the near-field transducer; and
 a temperature sensor on the carrier for sensing heat caused by the secondary tip when the primary tip is heating a region of the substrate.

2. The system of claim 1 wherein the substrate has regions of metallic or metallic alloy material and regions of non-metallic material, whereby the temperature sensed by the sensor is representative of the type of material in the substrate region heated by the primary tip.

3. The system of claim 1 wherein the substrate has a surface topography with regions of peaks and regions of valleys, whereby the temperature sensed by the sensor is representative of a peak region heated by the primary tip and a valley region heated by the primary tip.

4. The system of claim 1 wherein the sensor is an electrical conductor having a resistance that changes with temperature, and further comprising an electrical circuit coupled to the conductor for detecting changes in resistance of the conductor.

5. The system of claim 1 wherein the laser light generates resonant oscillations of electric charge in the primary tip.

6. The system of claim 1 wherein the near-field transducer is formed of a material comprising a metal selected from Au, Ag, Al and Cu.

7. A patterned-media magnetic recording disk drive comprising:
 a rotatable magnetic recording disk having a plurality of data tracks, each data track patterned into discrete magnetizable data islands separated by nonmagnetic spaces;
 a laser light source;
 a write head for generating write pulses to magnetize the islands as the disk rotates;
 a carrier for supporting the write head, the carrier having a disk-facing surface maintained at a distance less than the wavelength of the laser light from the disk;
 a metal or metal alloy near-field transducer on the carrier for receipt of the light, the transducer having a primary tip at said disk-facing surface for heating the islands as the disk rotates, and a secondary tip at said disk-facing surface and spaced from the primary tip for generating heat in response to receipt of light at the near-field transducer;
 an electrically conductive sensor on the carrier for sensing heat caused by the secondary tip, and for exhibiting a change in electrical resistance in response to a change in temperature;
 electrical circuitry coupled to the sensor for providing an output signal representative of a change in electrical resistance of the sensor; and
 a write clock responsive to said output signal and coupled to the write head for controlling the write pulses generated by the write head.

8. The disk drive of claim 7 further comprising an optical waveguide for the transmission of light from the source to the near-field transducer.

9. The disk drive of claim 7 wherein the near-field transducer is formed of a material comprising a metal selected from the group consisting of Au, Ag, Al and Cu.

10. The disk drive of claim 7 wherein the laser light source comprises a laser diode on the carrier.

11. The disk drive of claim 7 wherein the islands comprise pillars and the spaces comprise recesses and wherein the sensor circuitry output signal is representative of the difference in heat absorbed by a pillar from the primary tip and heat absorbed by a recess from the primary tip.

12. The disk drive of claim 7 wherein the disk has a substantially planar surface, the islands are formed of metallic material and the spaces are formed of non-metallic material, and wherein the sensor circuitry output signal is representative of the difference in optical power dissipated by a metallic island from the primary tip and optical power dissipated by a non-metallic space from the primary tip.

13. The disk drive of claim 7 wherein the data islands are perpendicularly magnetizable and wherein the write head comprises a perpendicular write head.

14. The disk drive of claim 7 wherein the data islands are formed of a material having a coercivity greater than the magnetic field that can be generated by the write head, and wherein the data islands are heated by the primary tip to lower the coercivity of the data islands to enable writing by the magnetic field of the write head.

15. The disk drive of claim 7 wherein the write clock comprises a phase-locked-loop (PLL) having a phase detector and a voltage-controlled-oscillator (VCO) for generating a write clock signal, the phase detector being responsive to the sensor circuitry output signal.

16. The disk drive of claim 15 further comprising a phase shifter coupled to the VCO for providing a phase offset between the sensor circuitry output signal and the write clock signal.

17. The disk drive of claim 7 wherein the primary tip of the near-field transducer and the write head are physically offset from each other on the carrier, and further comprising means for adjusting the write clock by a value representative of said offset.

* * * * *